United States Patent Office 3,335,964
Patented Aug. 15, 1967

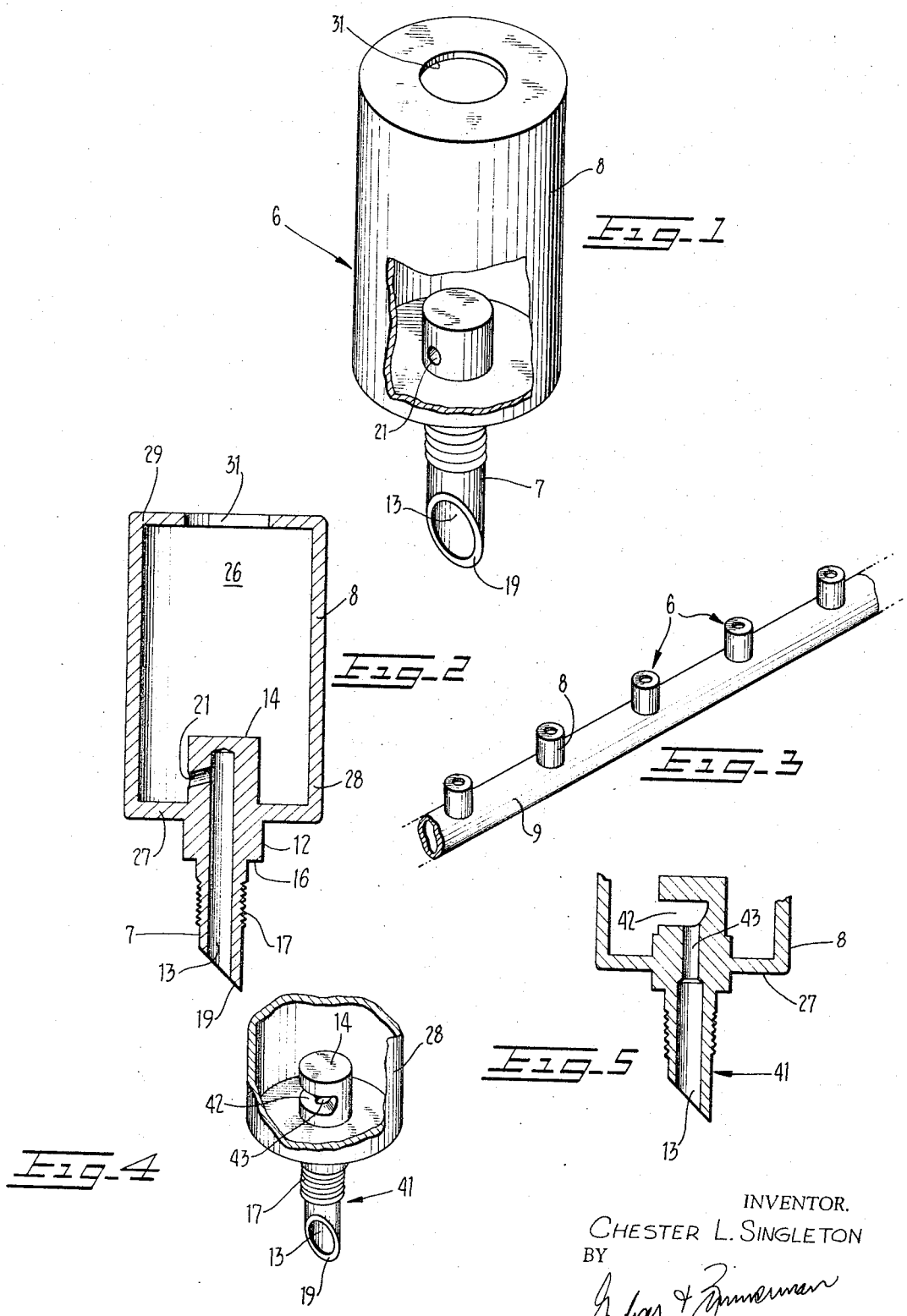

3,335,964
SHRUB WATERING DEVICE
Chester L. Singleton, 1146 Madison Ave.,
Livermore, Calif. 94550
Filed Sept. 29, 1965, Ser. No. 491,231
5 Claims. (Cl. 239—542)

ABSTRACT OF THE DISCLOSURE

A shrub watering device having a nozzle element insertable in a water line for delivering water to a body wherein the velocity force of the water is dissipated, and the water discharged from the body in a high volume, low velocity stream.

This invention generally relates to garden watering devices, and is more particularly directed towards a device for supplying water to plants adjacent the ground level and without getting such water on the foliage or flowers of the plants.

In many instances it is desirable to water plants or shrubs by merely soaking the ground around the same and avoiding the wetting of the shrubs themselves. By way of example, rose bushes require substantial watering, but application of water to the foliage will usually result in the formation of mildew on the leaves, burning of the leaves, removing insecticides, or other undesirable or deleterious results.

It is accordingly an object of the present invention to provide a watering device which may be connected to a suitable water supply means, such as a plastic pipe or garden hose, and which will discharge the water in the form of a low pressure, low velocity stream so that all of the discharged water will remain substantially immediately adjacent the device.

Another object of the invention is to provide a device as above described which is capable of ejecting substantial quantities of water while still restricting the flow path of such water to an area substantially immediately adjacent the outlet of the device.

A further object of the invention is to provide a shrub watering system in which a plurality of devices as described hereinabove may be operatively installed along a length of tubing, pipe or hose in which all of the devices will furnish substantially equal amounts of water.

Another object of the invention is to provide a water ejection head of the character described which may be mass produced at a relatively low cost thereby permitting the same to be economically employed in a watering system in which each plant to be watered is provided with its own head.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

FIGURE 1 is a perspective view of the shrub watering head of the present invention.

FIGURE 2 is a vertical cross-sectional view of the structure shown in FIGURE 1.

FIGURE 3 is a perspective view of a plurality of the heads installed in a common header.

FIGURE 4 is a perspective view of a modified form of nozzle member.

FIGURE 5 is a vertical cross-sectional view of the device shown in FIGURE 4.

As hereinabove explained, the apparatus of the present invention is designed to be operatively installed as a header of pipe, hose or the like, and deliver a low velocity, low pressure supply of water to an area immediately adjacent the outlet thereof, whereby a shrub may be effectively watered without danger of having the water sprayed or otherwise discharged onto the leaves or flowers of such shrub.

With particular reference to FIGURES 1 and 2 of the drawing, the device of this invention broadly includes a watering head 6 having a nozzle portion 7 and a body portion 8. As will presently be described in more detail, the nozzle is adapted to be operatively connected to a water supply member (such as the pipe 9 shown in FIGURE 3) and effectively limit or meter the amount of water flowing therethrough and discharge such water into the body 8, where the high velocity energy of the water is absorbed by turbulence permitting it to be discharged in the form of a low pressure, low velocity stream.

The nozzle 7 includes a tubular body 12 having an axial bore 13 therein with the upper end of the bore closed by an end wall 14. The lower end of the body is of reduced diametrical extent to provide a transaxial shoulder 16, the lower portion likewise being threaded as indicated at 17 for engagement of the nozzle with the pipe 9. It will also be noted that the lower end of the body is cut at an angle to provide a bevelled or sharpened end 19 so as to facilitate its insertion into a plastic pipe 9 or the like. After inserting such end 19 into the pipe, the nozzle may be rotated causing the threads 17 to engage the pipe wall until the shoulder 16 is engaged.

The bore 13 of nozzle 7 communicates with a radial passage 21 adjacent its upper end, and preferably such passage is directed slightly downwardly so as to provide an acute angle with the bore axis. Passage 21 extends through the body 12 so that when the nozzle is operatively installed in pipe 9, water passing through the latter will flow through the bore 13 and passage 21 and will be discharged from the latter as a relatively high velocity narrow stream. During rush flow, the water will be metered, i.e., controlled as to quantity, by either the bore 13 or the passage 21, depending upon which has the smaller diameter. The volume of water, however, passing through nozzle 7 will be substantially less than the volume of water flowing in pipe 9, since the metering diameter is only a small percentage of the diameter of pipe 9. By way of example, assuming that pipe 9 has a ¾ inch diameter, the diameter of the metering bore or passage may be in the neighborhood of about ¹⁄₁₆ inch.

With this arrangement, it will be understood that only a small quantity of water otherwise available in pipe 9 will be metered through the nozzle, but due to the restricted size of the metering passage 21, the water, as above mentioned, will be discharged as a high velocity jet from such passage.

The body 8 is utilized to absorb the energy produced by such a high velocity jet and convert the same into the desired low velocity, low pressure stream. As will be seen, body 8 is substantially hollow and defines a chamber 26 of generally tubular form. The bottom wall 27 extends radially outwardly from the nozzle portion 12 below the passage 21, and the side wall 28 extends upwardly substantially beyond the upper end 14 of the nozzle to terminate in a top wall 29. By way of example, the diameter of chamber 26 is about one-half inch and top wall 29 is provided with a discharge aperture 31 of about one-quarter inch diameter. Consequently, the amount of water ejected into the chamber 26 through passage 21 will not be sufficient to effect any high velocity discharge through aperture 31, but instead, water will merely flow from the latter without any appreciable velocity or pressure. In other words, the water will not shoot into the air from the aperture 31 and thus will not cause a wetting of shrub foliage or the like which may be overlying such aperture.

In FIGURE 3, I have shown a plurality of heads on the pipe 9, and in practice, I have found that with pipe 9 formed of ¾ inch diameter plastic tubing, operating under about 40 p.s.i. line pressure, I can use about forty heads 6 on one hundred feet of pipe with all heads furnishing about the same quantity of water. By bending or curving the pipe to follow the arrangement of the plants, a head can then be inserted in the pipe at each plant location.

In FIGURES 4 and 5, a modified form of nozzle 41 is illustrated. In this nozzle, the nozzle body portion 42 is provided with a transaxial slot 42 at the upper end of the axial passage 13. Here, however, the upper end of the bore 13 is of reduced diameter, as shown at 43 so that the desired metering and limiting of water flow may be provided. The diameter of the bore portion 43 is roughly equivalent to that of passage 21 of nozzle 7, and the chamber into which the water is ejected by the nozzle for subsequent discharge through the opening 31 is the same as that previously described.

What is claimed is:

1. A device of the character described including a nozzle element having a lower end adapted to be inserted in a water line, said nozzle having a passage extending upwardly from said lower end and terminating in a transaxial discharge means, a body including a tubular side wall, a bottom wall and a top wall, said bottom wall extending radially outwardly from said nozzle element subjacent said discharge means and said top wall being disposed in spaced relation to the upper end of said nozzle and having a discharge opening therein of substantially greater diameter than the nozzle passage, and said body defining a chamber for receiving water from said nozzle discharge means and discharging such water through said top wall opening.

2. A device as set forth in claim 1 in which said nozzle is provided with means overlying the upper end of said passage whereby water ejected from the nozzle is directed towards a side wall of said body.

3. A device as set forth in claim 1 in which said nozzle passage includes a portion of reduced cross-sectional size adjacent said discharge means.

4. A device of the character described including a nozzle element having a lower end adapted to be connected to a water supply line and having an axial passage extending upwardly from said lower end and terminating in a discharge passage, a body including a tubular side wall, a bottom wall and a top wall, said bottom wall being disposed intermediate said discharge passage and said lower end, said side wall being spaced concentrically outwardly from said nozzle element, and said top wall being spaced above the upper end of said nozzle element, said body defining with said nozzle element a substantially enclosed chamber for receiving water from said discharge passage, and said top wall having a discharge opening of greater cross-sectional size than said nozzle discharge passage.

5. A device as set forth in claim 4 in which the diameter of said body chamber is substantially greater than the size of said discharge opening, and in which said discharge passage is oriented in a direction other than directly towards said discharge opening.

References Cited

UNITED STATES PATENTS

| | | | |
|---|---|---|---|
| 1,520,048 | 12/1924 | Baird | 239—547 X |
| 2,521,238 | 9/1950 | McCann | 239—542 |
| 2,723,879 | 11/1955 | Martin | 239—542 X |
| 2,904,266 | 9/1959 | Bartlett | 239—568 X |
| 2,978,187 | 4/1961 | Hesson | 239—499 |
| 2,985,383 | 5/1961 | Rasmusson et al. | 239—499 |

FOREIGN PATENTS 256,735  5/1964  Australia.

M. HENSON WOOD, JR., *Primary Examiner.*

EVON C. BLUNK, *Examiner.*

V. M. WIGMAN, *Assistant Examiner.*